(12) United States Patent
Anderson et al.

(10) Patent No.: US 6,827,345 B2
(45) Date of Patent: Dec. 7, 2004

(54) WEDGE-LOCK FASTENER AND ASSOCIATED INSTALLATION AND ASSEMBLY METHODS

(75) Inventors: Matthew L. Anderson, Carnation, WA (US); William J. Koch, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/369,879

(22) Filed: Feb. 20, 2003

(65) Prior Publication Data

US 2004/0164475 A1 Aug. 26, 2004

(51) Int. Cl.[7] ................................................. B23Q 1/00
(52) U.S. Cl. ........................................ 269/49; 269/48.1
(58) Field of Search .......................... 269/49, 48.1, 52, 269/47, 900, 48.4

(56) References Cited

U.S. PATENT DOCUMENTS

| | | |
|---|---|---|
| 2,256,634 A | 9/1941 | Webb |
| 2,317,315 A | 4/1943 | Wallace |
| 2,327,148 A | 8/1943 | Yates |
| 2,353,248 A | 7/1944 | Lamb |
| 2,368,408 A | 1/1945 | Brooking |
| 2,370,336 A | 2/1945 | Wallace |
| 2,372,904 A | 4/1945 | McCarthy |
| 2,424,309 A | 7/1947 | Elvy |
| 2,439,531 A | 4/1948 | Wallace |
| 2,659,954 A | 11/1953 | Woolsey |
| 2,775,155 A | 12/1956 | Tompkins et al. |
| 3,144,805 A | 8/1964 | Lee |
| 3,202,037 A | 8/1965 | Stewart et al. |
| 3,233,504 A | 2/1966 | Jones |
| 3,260,151 A | 7/1966 | Jones |
| 3,289,525 A | 12/1966 | Lee |
| 4,192,044 A | 3/1980 | Ballerini |
| 5,042,787 A | 8/1991 | Duffaud |
| 5,785,324 A * | 7/1998 | Williams et al. ........... 279/2.03 |
| 5,845,898 A * | 12/1998 | Halder et al. ............... 269/48.1 |
| 5,927,919 A | 7/1999 | Blankenship et al. |
| 6,364,300 B1 * | 4/2002 | Kita ............................. 269/32 |
| 6,390,460 B2 | 5/2002 | Chupick |
| 6,439,560 B2 * | 8/2002 | Sawada et al. ................ 269/32 |

FOREIGN PATENT DOCUMENTS

FR 2676258 A 11/1992

* cited by examiner

Primary Examiner—Lee D. Wilson
(74) Attorney, Agent, or Firm—Alston & Bird LLP (57) ABSTRACT

A wedge-lock fastener is provided in which the distance by which the tongue protrudes beyond a workpiece may be controlled. The wedge-lock fastener may include a shank and an adjustable spacer member mounted upon the shank and adapted for controlled lengthwise movement relative thereto so as to adjust the position of the tongue with respect to the workpiece. Correspondingly, a method for installing a wedge-lock fastener is provided in which the respective forward ends of the tongue and tongs are inserted through aligned holes defined by two or more workpieces and the tongs are then retracted to clamp the workpieces together with the respective forward ends of the tongue and the tongs being disposed completely within a counterbore defined by a workpiece.

21 Claims, 7 Drawing Sheets

WEDGE-LOCK FASTENER AND ASSOCIATED INSTALLATION AND ASSEMBLY METHODS

FIELD OF THE INVENTION

The present invention relates generally to an improved wedge-lock fastener and associated installation and assembly methods and, in one advantageous embodiment, to a wedge-lock fastener designed such that the tongue of the wedge-lock fastener may be completely disposed within a counterbore defined by a workpiece engaged by the wedge-lock fastener.

BACKGROUND OF THE INVENTION

Wedge-lock fasteners are utilized in a wide variety of applications. In a typical application, one or more wedge-lock fasteners are utilized to temporarily secure two or more workpieces together. While the workpieces are temporarily held together by the wedge-lock fasteners, permanent fasteners, such as rivets or the like, may be installed. Thereafter, the wedge-lock fasteners may be removed and reused.

By way of example, wedge-lock fasteners may be utilized during the assembly of an aircraft fuselage. In a traditional structure, stringers are temporarily affixed to the skin with a plurality of wedge-lock fasteners. The stringers are then riveted to the skin and the wedge-lock fasteners are removed from the skin/stringer assembly. Additionally, shear ties are temporarily secured to frames with a plurality of wedge-lock fasteners. After riveting the shear ties to the frames, these wedge-lock fasteners are also removed. The skin/stringer assembly is then temporarily fastened to the frame/shear tie assembly, such as by means of a plurality of wedge-lock fasteners. The skin/stringer assembly is then riveted to the frame/shear tie assembly, such as by riveting the shear ties to the skin. Thereafter, the wedge-lock fasteners may again be removed. Finally, stringer clips may be temporarily fastened to the frames and the stringers. After riveting the stringer clips to both the stringers and the frames, the wedge-lock fasteners may be removed. Thus, wedge-lock fasteners or other temporary fasteners may be repeatedly utilized during a number of the steps of the conventional process for assembling an aircraft fuselage.

While wedge-lock fasteners work well in a number of situations, a wedge-lock fastener is unsuitable for certain applications, as described below in conjunction with the conventional wedge-lock fastener 10 depicted in FIG. 1. As shown, a conventional wedge-lock fastener includes a shank 12 that extends lengthwise between a forward end 14 that is adapted to be placed in contact with one of the workpieces 16 to be clamped together, and an opposed rear end 18. The shank defines a central passage 20 opening through both the forward and rear ends. The wedge-lock fastener also includes a tong assembly extending lengthwise through the passage defined by the shank. The tong assembly includes a pair of tongs 22 extending through the opening defined by the forward end of the shank. In addition, the forward end of each tong includes a barb 24 extending laterally outward and defining a shoulder 26 for engaging a workpiece as described below. A tong assembly also includes a threaded portion 28 disposed rearward of the pair of tongs. The wedge-lock fastener also includes a tong nut 30 secured to the rear end of the shank and adapted to threadably engage the threaded portion of the tong assembly. Thus, the pair of tongs may be controllably advanced and withdrawn relative to the shank by the rotation of the tong nut relative to the shank.

A conventional wedge-lock fastener 10 also includes a grommet 32 that is sized to fit snugly within the passage 20 defined by the shank 12. The grommet 32 may be shrink-fitted, crimped, or may be an integral part of the tong assembly. In addition, the interior wall of the shank and the exterior surface of the grommet include lengthwise extending ribs and grooves that cooperate to guide the tong assembly in a lengthwise direction within the passage defined by the shank and to prevent rotation of the tong assembly relative to the shank. The grommet and associated grooves vary in shape and may be hexagonal or polygonal as well. The wedge-lock fastener also includes a tongue 34 disposed between the pair of tongs 22 and extending through the opening defined by the forward end 14 of the shank. The wedge-lock fastener typically includes a tongue retainer ring 36 disposed within the passage defined by the shank so as to effectively retain the rear end of the tongue within the shank and, in particular, between the forward end of the shank and the retainer ring.

During installation through the aligned holes defined by two or more workpieces 16, the tongs 22 are advanced relative to both the shank 12 and the tongue 34 by rotation of the tong nut 30 with respect to the shank. The tongs are extended such that the tongs extend beyond the tongue, thereby permitting the barbed forward ends 24 of the tongs to be collapsed or displaced toward and into contact with one another. The respective forward ends of the tongs and the tongue may then be inserted through the hole, which has a diameter slightly larger than the width of the barbed forward ends of the tongs once the barbed forward ends of the tongs have been collapsed or displaced toward and into contact with one another, but smaller than the width of the barbed forward ends of the tongs once the barbed forward ends of the tongs are separated by the tongue as described below.

In order to clamp a pair of workpieces 16 together, corresponding holes defined by the workpieces are aligned, and the respective forward ends of the tongs 22 and the tongue 34 are inserted through the aligned holes while the barbed forward ends 24 of the tongs are extended beyond the tongue and deflected toward one another. The tong nut 30 is then rotated in the opposite direction relative to the shank 12 so as to retract the tong assembly. The tong assembly is retracted until the workpieces are snugly engaged on one side by the forward end 14 of the shank and on the other side by the respective shoulders 26 defined by the barbed forward ends of the tongs. During the process of retracting the tongs, the barbed forward ends of the tongs draw alongside the tongue so as to spread the barbed forward ends of the tongs apart and into engagement with the workpiece, as shown in FIG. 1.

Figure 1:
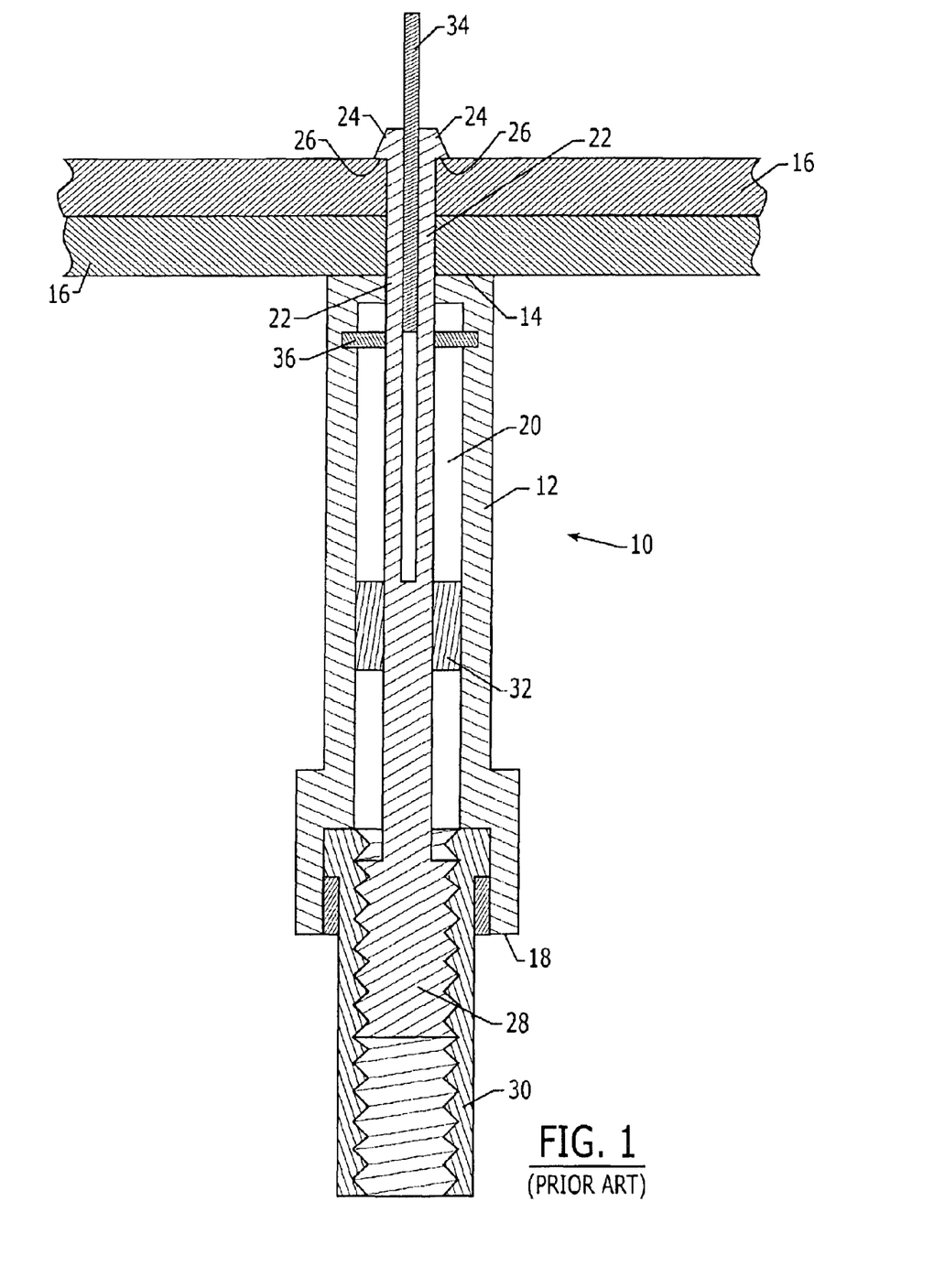
FIG. 1 is a cross-sectional view of a conventional wedge-lock fastener.

While a conventional wedge-lock fastener 10 provides for the secure engagement of two or more workpieces 16 as shown in FIG. 1, difficulties arise if one or more additional workpieces must be placed on or otherwise assembled with the workpieces that are clamped together by the wedge-lock fastener. As will be noted in FIG. 1, not only do the barbed forward ends 24 of the tongs 22 extend beyond the surface of the workpieces, but the tongue 34 can extend beyond the surface of the workpieces by a significant distance, depending upon the relative thickness of the workpieces. In order to accommodate the protrusion of the barbed forward ends of the tongs and the tongue beyond the surface of the workpieces, the additional workpiece that is to be placed thereupon may also define an opening through which the barbed forward ends of the tongs and the forward end of the tongue may extend. Especially for workpieces of a relatively large size, however, it may be difficult to place the additional workpiece upon the workpieces that are clamped together with the wedge-lock fasteners without scratching the additional workpiece with the protruding tongues of the wedge-lock fasteners.

By way of a more specific example, an alternative process for assembling aircraft fuselages is being developed. In this process, the stringers and frames are first temporarily fastened together with one or more wedge-lock fasteners or other temporary fasteners. In this regard, the frames define a number of mouse-holes in which the throat of the mouse-hole is smaller than the remainder or body of the mouse-hole. Generally T-shaped stringers are positioned relative to the frames so as to extend through respective mouse-holes defined by the frames. The relatively constricted throat of the mouse-holes is too narrow to simultaneously insert the stringers of a large skin/stringer assembly, thereby rendering the pre-assembly of the skin and the stringers impractical. Thus, the stringers are temporarily fastened to the frames by wedge-lock fasteners or the like that extend through assembly holes that define an appropriate frame of reference for the assembly. The skin is then to be assembled to the frame/stringer assembly while the stringers are temporarily fastened to the frames. However, the tongues of the conventional wedge-lock fasteners protrude, sometimes significantly, beyond the frame/stringer assembly, thereby preventing the straightforward placement of the skin upon the frame/stringer assembly and rendering the skin vulnerable to scratching by the protruding tongues of the wedge-lock fasteners. Thus, this alternative process for assembling aircraft fuselages cannot utilize conventional wedge-lock fasteners in a typical manner.

Since the stringers and the frames cannot be temporarily fastened with wedge-lock fasteners during this alternative assembly process, it is contemplated that the stringers for an entire panel could be placed upon the frames and the corresponding holes defined by the stringers and the frames could be aligned by hand, using gravity as a temporary restraint. As a result of the curvature of an aircraft fuselage, however, some stringers would have to be placed on the frames at a relatively great height, such as about 20 feet, with operators standing on stepladders, cherry pickers, or the like. The skin would then have to be placed carefully on the stringers and frames without disrupting their alignment and while simultaneously aligning corresponding holes in the skin with the aligned holes defined by the stringers and the frames. Once the frames, stringers and skins have been properly aligned, temporary fasteners, such as conventional wedge-lock fasteners, could be placed through these holes, and the assembly could then be rotated to ground level for the installation of permanent fasteners.

However, this alternative assembly technique suffers from a number of disadvantages, including the danger involved in assembling a very large, heavy structure while standing upon stepladders or cherry pickers during a portion of the process. In addition, the simultaneous alignment of the corresponding holes defined by the stringers, frames and skin is practically intractable. Finally, the reliance upon gravity as a temporary restraint may be insufficient to prevent motion of the stringers relative to the frames, which are typically disposed at an incline, particularly in the presence of vibration during the placement of the skin upon the frames and stringers.

Thus, it would be desirable to design an improved wedge-lock fastener capable of securely engaging a plurality of workpieces, while permitting an additional workpiece to be placed thereupon without making the additional workpiece susceptible of being scratched by the protruding tongue of the wedge-lock fastener. Additionally, it would be desirable to develop an improved method of assembling a plurality of workpieces with a wedge-lock fastener so as to permit an additional workpiece to be readily placed upon or otherwise positioned relative to a plurality of workpieces clamped together by a wedge-lock fastener.

SUMMARY OF THE INVENTION

An improved wedge-lock fastener and associated installation and assembly methods are therefore provided according to various aspects of the present invention. The wedge-lock fastener is designed to permit the distance by which the forward end of the tongue protrudes beyond the workpiece to be controlled. Correspondingly, a method for installing a wedge-lock fastener is provided in which the respective forward ends of the tongue and tongs are inserted through respective holes defined by two or more workpieces and the tongs are then retracted to clamp the workpieces together with the respective forward ends of the tongue and the tongs being disposed completely within a counterbore defined by a workpiece. Since the respective forward ends of the tongue and the tongs are completely disposed within a counterbore defined by one of the workpieces, a method for assembling a plurality of workpieces is also provided in which an additional workpiece is placed upon and attached to the workpieces that are secured by the wedge-lock fastener. For example, a skin can be placed upon an assembly of stringers and frames that are temporarily held together by a wedge-lock fastener without scratching the skin.

According to one aspect of the present invention, a wedge-lock fastener is provided that includes a shank defining a lengthwise extending passage opening through a forward end. The wedge-lock fastener also includes an adjustable spacer member adapted for controlled lengthwise movement relative to the shank. For example, the adjustable spacer may threadably engage the forward end of the shank. In this embodiment, for example, the forward end of the shank may be externally threaded with the adjustable spacer member being internally threaded and mounted upon the forward end of the shank in a surrounding relationship thereto. The forward end of the adjustable spacer member extends beyond the forward end of the shank by a selectable distance.

In the typical application, the wedge-lock fastener is adapted to clamp a plurality of workpieces. The adjustable spacer member is therefore preferably capable of extending beyond the forward end of the shank by a range of selectable distances that is at least as large as the anticipated variations in thickness of the plurality of workpieces. Thus, the wedge-lock fastener can securely clamp together a plurality of workpieces even as those workpieces vary somewhat in thickness.

In order to maintain the selectable distance, the wedge-lock fastener may include a locking member for securing the adjustable spacer member in position relative to the shank. The locking member may be, for example, a lock nut disposed upon and threadably engaging the shank rearward of the adjustable spacer member.

In order to effectively clamp the workpieces, the wedge-lock fastener also includes at least two tongs adapted for lengthwise movement relative to the shank and the adjustable spacer member. Each tong has a respective forward end extending beyond the forward ends of the shank and the adjustable spacer member. The wedge-lock fastener also includes a tongue disposed between the tongs. The tongue extends from a rear end within the passage defined by the shank to a forward end that extends beyond the forward ends of the shank and the adjustable spacer member.

In order to install the wedge-lock fastener, the tongue and the tongs of the wedge-lock fastener may be inserted through a hole defined by a workpiece and, more commonly, by a pair of aligned holes defined by first and second workpieces. For example, a plurality of stringers may be positioned relative to a plurality of frames such that respective holes defined by the stringers and frames are aligned and the respective forward ends of the tongue and at least two tongs of the wedge-lock fastener may be inserted therethrough. The position of the tongue relative to the workpiece is then altered by controllably moving the adjustable spacer member relative to the shank of the wedge-lock fastener, such as by threadably advancing or retracting the adjustable spacer member relative to the shank. The movement of the adjustable spacer member relative to the shank of the wedge-lock fastener correspondingly adjusts the distance by which the adjustable spacer member extends beyond the shank and, in turn, similarly adjusts the position of the tongue relative to the workpiece. For example, as the adjustable spacer member is advanced so as to extend further beyond the shank, the tongue is correspondingly retracted toward the workpiece. Alternatively, as the adjustable spacer member is retracted so as not to extend as far beyond the shank, the tongue is correspondingly extended further beyond the workpiece. Once the tongue is properly positioned relative to the workpiece(s), the adjustable spacer member may be secured in position relative to the shank. Thereafter, the tongs are retracted relative to the tongue such that the respective forward ends of the tongs are urged outwardly by the tongue and operatively engage the workpiece.

In instances in which the wedge-lock fastener serves to clamp two or more workpieces together, one of the workpieces may define a counterbore into which the aligned holes defined by the workpieces open. In this embodiment, the wedge-lock fastener is inserted from the side of the workpieces opposite the counterbore. According to this aspect of the present invention, the forward ends of the tongue and the tongs may be positioned completely within the counterbore. In this regard, the adjustable spacer member may be controllably moved relative to the shank until the forward end of the tongue is within the counterbore. After retracting the tongs so as to operatively engage the workpieces, another workpiece, such as the skin of an aircraft or other structure, may be placed on the surface of the workpieces through which the counterbore opens while the wedge-lock fastener remains installed. Since the respective forward ends of the tongue and the tongs are completely disposed within the counterbore, however, the additional workpiece is not scratched and may be readily positioned upon the other workpieces that remain temporarily fastened together.

In instances in which the forward end of the tongue still extends beyond the surface of the workpieces once the tongs have been retracted so as to engage the workpieces, at least the forward end of the tongue that extends beyond the surface of the workpieces may be removed. For example, that portion of the tongue that extends beyond the surface of the workpieces may either be cut off or ground off. An additional workpiece may then be placed upon the other workpieces that remain fastened together by the wedge-lock fastener without scratching the additional workpiece. Moreover, even after the forward end of the tongue has been removed, the wedge-lock fastener may accommodate variations in the thickness of the workpieces that are clamped or temporarily fastened together by controllably moving the adjustable spacer member relative to the shank. In this regard, the wedge-lock fastener is adapted to securely clamp workpieces together that vary in thickness by any amount within the range of controlled movement of the adjustable spacer member relative to the shank of the wedge-lock fastener.

The wedge-lock fastener of the present invention is therefore adapted to securely clamp a plurality of workpieces together. By permitting the position of the tongue relative to the workpieces to be controlled by lengthwise movement of an adjustable spacer member relative to the shank, the wedge-lock fastener can be mounted such that the respective forward ends of the tongue and the tongs are disposed within a counterbore defined by one of the workpieces. Moreover, an installation method of the present invention provides for the removal of at least a forward end of the tongue if the forward end of the tongue otherwise extends beyond the surface of the workpiece. As such, an additional workpiece can be placed upon the plurality of workpieces that are temporarily clamped together by the wedge-lock fastener without scratching the additional workpiece or otherwise impairing the assembly process. In one exemplary application, the wedge-lock fastener may temporarily fasten the stringers and frames together while a skin is mounted thereto. After permanently fastening the skin to the stringers and frames, the wedge-lock fasteners may be removed, thereby simplifying the process of assembling an aircraft fuselage or other structure.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
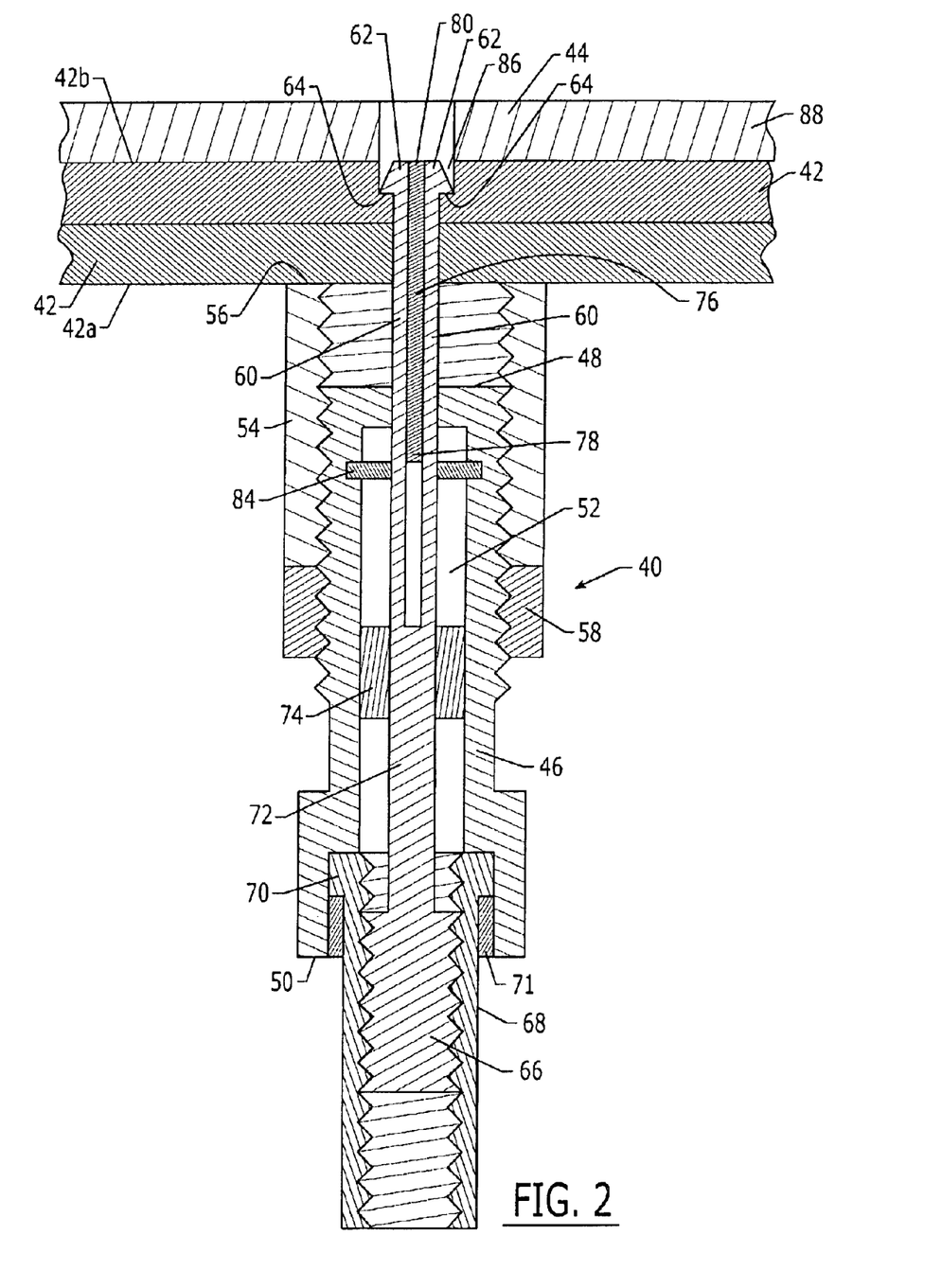
FIG. 2 is a cross-sectional view of a wedge-lock fastener according to one embodiment of the present invention.
Figure 3:
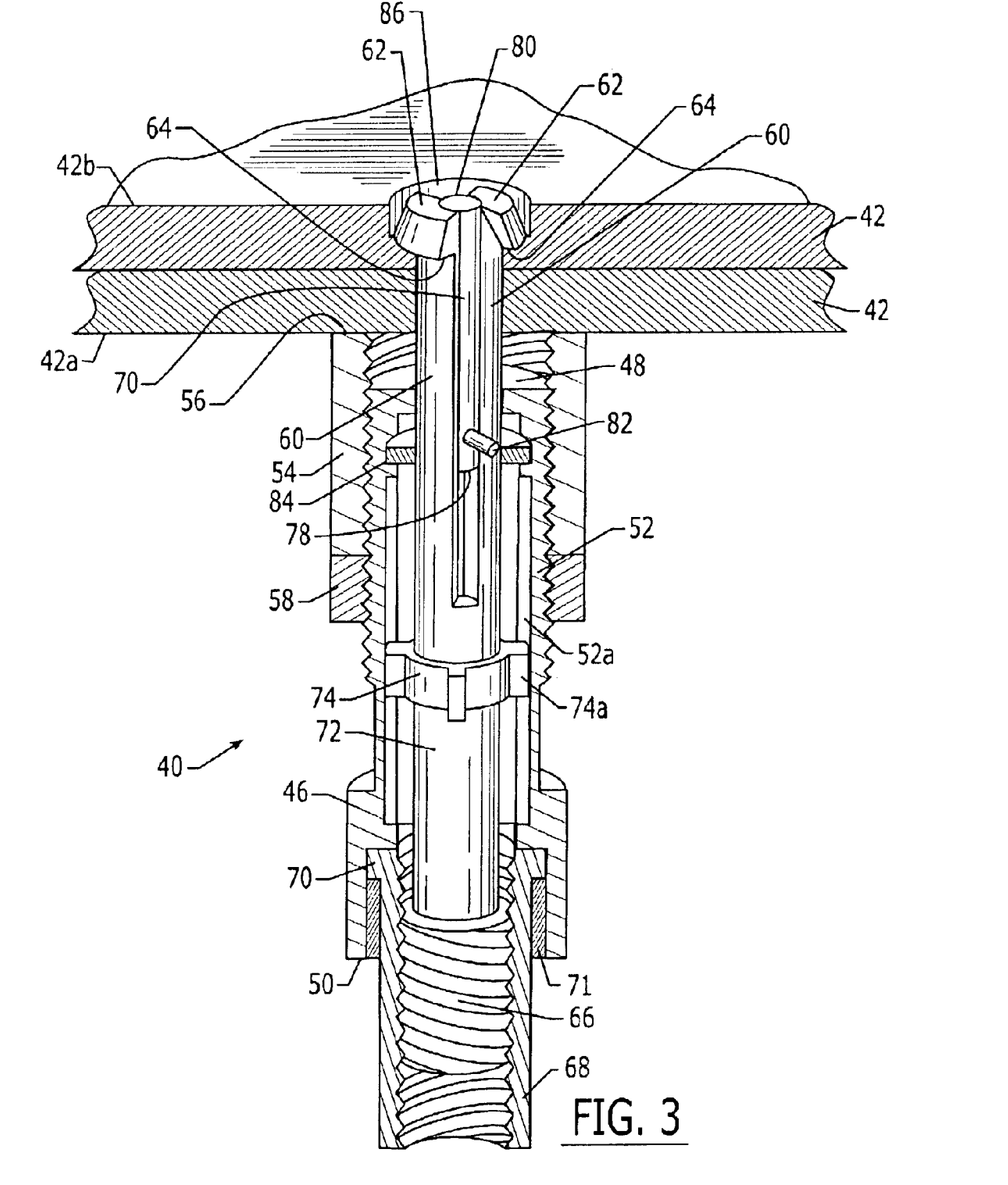
FIG. 3 is a fragmentary perspective view of the wedge-lock fastener of FIG. 2.

As shown in FIGS. 2 and 3, an improved wedge-lock fastener 40 is provided according to one aspect of the present invention for clamping two or more workpieces 42 together, at least temporarily, such as during an assembly process or the like. In this regard, the wedge-lock fastener is capable of securely clamping two or more workpieces together while an additional workpiece 88 is assembled thereto without scratching the additional workpiece. While the wedge-lock fastener may be useful for clamping together a wide variety of workpieces, one exemplary application that will be discussed below involves the wedge-lock fastener of the present invention temporarily clamping together a plurality of frames and a plurality of stringers, while the skin of an aircraft or other structure is mounted to the stringers. As a result of the unique design of the wedge-lock fastener of the present invention, the wedge-lock fastener does not impede or otherwise obstruct the assembly of the skin to the stringers and does not scratch the skin during the assembly process.

The wedge-lock fastener 40 includes a shank 46 that extends lengthwise between opposed forward and rear ends 48, 50. The shank is generally cylindrical and defines a lengthwise extending passage 52 opening through the forward end and, as shown in FIGS. 2 and 3, generally through the rear end as well. While the shank may have a constant diameter along its entire length, the shank may be stepped such that a portion of the shank, such as the rearmost portion of the shank, has a larger diameter than other portions of the shank, if desired. Although the passage defined by the shank may have various shapes, the passage is also typically cylindrical.

The wedge-lock fastener 40 of the present invention also includes an adjustable spacer member 54 adapted for controlled lengthwise movement relative to the shank 46. Thus, the adjustable spacer member may be controllably positioned relative to the shank such that the forward end 56 of the adjustable spacer member extends beyond the forward end 48 of the shank by a selectable distance. While the adjustable spacer member may be adapted for controlled lengthwise movement relative to the shank in various manners, the adjustable spacer member and the shank of the illustrated embodiment are threadably engaged. In this regard, at least the forward portion of the shank and, in some embodiments, both the forward portion and the medial portion of the shank are externally threaded, while the adjustable spacer member is correspondingly internally threaded. Thus, the adjustable spacer member may be threadably secured to the shank and adapted to be positioned relative to the shank from a retracted position in which the forward end of the adjustable spacer member is generally at least flush with the forward end of the shank to an extended position in which the forward end of the shank extends beyond the forward end of the shank by a distance only slightly less than the length of the adjustable spacer member. Moreover, the adjustable spacer member can be positioned at any of a plurality of positions between the retracted and the extended positions by appropriately threadably positioning the adjustable spacer member relative to the shank.

As will be apparent to those skilled in the art, the range of distances that the adjustable spacer member 54 may extend beyond the forward end 48 of the shank 46 is defined by appropriately selecting the length of the adjustable spacer member and/or the length of the threaded portion of the shank. As described below, however, the range of distances that the adjustable spacer member may extend beyond the forward end of the shank is preferably selected to be at least as large as the anticipated variations in the collective thickness of the workpieces to be clamped together by the wedge-lock fastener 40. Although the exterior of the adjustable spacer member is generally cylindrical, the exterior of the adjustable spacer member may have other shapes so long as the interior of the adjustable spacer member is adapted to mate, such as by threaded engagement, with the forward end of the shank.

The wedge-lock fastener 40 also includes a locking member 58, such as a lock nut, disposed upon the shank 46 for securing the adjustable spacer member 54 in position relative to the shank. As shown in FIGS. 2 and 3, the locking member may be disposed rearward of the adjustable spacer member and is also adapted to engage the shank, such as by threaded engagement therewith. In this embodiment, for example, the locking member is comprised of an internally threaded lock nut that threadably engages the threaded portion of the shank.

During installation, the locking member 58 may be threadably retracted relative to the adjustable spacer member 54 along the shank 46 and the adjustable spacer member may then be appropriately positioned upon the shank. Once the adjustable spacer member has been appropriately positioned relative to the shank, the locking member may be threadably advanced until it engages or contacts the rear end of the adjustable spacer member. The locking member will then prevent movement of the adjustable spacer member in a rearward direction relative to the shank. Since forward movement of the adjustable spacer member relative to the shank is also generally prevented by the abutment or other engagement of the forward end 56 of the adjustable spacer member with the workpieces 42 that are clamped together by the wedge-lock fastener as described below, the adjustable spacer member is effectively locked in position. Although the locking member may be sized in various manners, the locking member is generally relatively small or thin in a lengthwise direction, especially relative to the adjustable spacer member, since the length or thickness of the locking member reduces the maximum length of the adjustable spacer member and, in turn, the range of selectable distances by which the adjustable spacer member may extend beyond the forward end 48 of the shank by a corresponding amount.

The wedge-lock fastener 40 also includes a tong assembly including at least two tongs 60 adapted for lengthwise movement relative to the shank 46 and the adjustable spacer member. In this regard, the wedge-lock fastener generally includes a pair of tongs with each tong having a respective forward end extending beyond the shank and the adjustable spacer member. In order to engage a workpiece, the forward ends of the tongs generally include a barb 62 extending laterally outward. In order to facilitate the insertion of the tongs through holes defined by one or more workpieces 42, the barbed forward ends of the tongs may be tapered in a laterally outward direction from the forwardmost end of the tong. Thus, the barbed forward ends of the tongs define respective shoulders 64 for engaging the workpiece.

The tong assembly also generally includes a rear portion 66 adapted to controllably position the tongs 60 relative to the shank 46 and the adjustable spacer member 54. In the illustrated embodiment, for example, the tong assembly includes a threaded rear portion. As such, the wedge-lock fastener 40 of the illustrated embodiment also includes a tong nut 68 defining an internally threaded passage for engaging the threaded rear portion of the tong assembly. As illustrated in FIGS. 2 and 3, the tong nut engages the shank proximate the rear end 50 thereof and extends rearwardly from the shank. The tong nut is retained by the shank, but is permitted to rotate relative thereto. In the illustrated embodiment, for example, the tong nut includes a collar 70 that extends radially outward from the forward end of the tong nut that is received within a corresponding circumferential groove defined by the shank and opening into the passage 52. Although the tong nut and the shank may be assembled in various manners, the rear end of the shank of one embodiment defines an opening that is at least as large as the collar such that that portion of the collar may be inserted therein. A sleeve 71 that surrounds a medial portion of the tong nut may then be inserted into the opening and the shank may be crimped to the sleeve to secure the sleeve in position. Since the inner diameter of the sleeve is smaller than that of the collar, but slightly larger than that of the shank, the sleeve couples the tong nut to the shank, while permitting the tong nut to rotate relative to the shank.

The length of the stroke of the tongs 60, that is, the range through which the tongs may be extended beyond the forward end 48 of the shank 46, is governed by the length of the tong nut 68. Thus, the tong nut is advantageously selected to provide the tongs with the desired range of motion.

While the threaded rear portion 66 of the tong assembly could be directly connected to the tongs 60, the tong assembly of the illustrated embodiment includes a tong shaft 72 extending between and connecting the threaded rear portion and the pair of tongs. As shown, the tong shaft extends through a portion of the passage 52 defined by the shank 46. While the tong assembly is generally integrally formed, the tong assembly may be assembled from discrete components, if desired.

The wedge-lock fastener 40 also generally includes a guide member 74 for controllably guiding the tong assembly during its lengthwise movement relative to the shank 46. In this regard, the guide member can include a grommet that engages the tong assembly, such as the tong shaft 72, and moves in concert therewith. In this regard, the grommet may be radially compressed about the tong shaft. The exterior surface of the grommet and the interior surface of the shank that defines the passage 52 may define lengthwise extending grooves and corresponding radially extending projections for engaging respective grooves. In this regard, the interior surface of the shank may define a plurality of lengthwise extending grooves that open into the passage and the exterior surface of the shank may define a plurality of radially outwardly extending projections, such as lengthwise extending ribs or the like, that engage corresponding grooves and ride therewithin during movement of the tong assembly relative to the shank. Alternatively, the exterior surface of the grommet could define a plurality of grooves and the interior surface of the shank could define a plurality of radially inwardly extending projections for engaging respective grooves. In either embodiment, the engagement of the guide member with the shank permits relative lengthwise movement therebetween, while preventing relative angular movement about a lengthwise extending axis defined through the passage by the shank.

The wedge-lock fastener 40 also includes a tongue 76 disposed between the tongs 60 proximate at least a forward end 62 of the tongs. In this regard, the tongue extends from a rear end 78 disposed within a forward portion of the passage 52 defined by the shank 46 to a forward end 80 that extends beyond the shank and the adjustable spacer member 54 and is proximate the respective forward ends of the tongs in instances in which the tongs have been retracted. As shown in FIGS. 2 and 3, the tongs are generally spaced apart from one another by a predefined separation distance. The tongue is generally sized to have a width approximately equal to the separation distance so as to fill the gap between the tongs. Unlike the tongs that are capable of lengthwise movement relative to the shank, the tongue is generally fixed in position with respect to the shank. In this regard, the rear end of the tongue may be T-shaped with the laterally extending portions 82 of the T-shaped rear end of the tongue shown most clearly in FIG. 3. As also shown in FIG. 3, a retainer ring 84 encircles the tongs within the passage defined by the shank, and is disposed within a corresponding circumferential groove defined by the interior surface of the shaft. Thus, the rear end of the tongue is secured within the forwardmost portion of the passage defined by the shank between the retainer ring and the forward end 48 of the shank.

Figure 5:
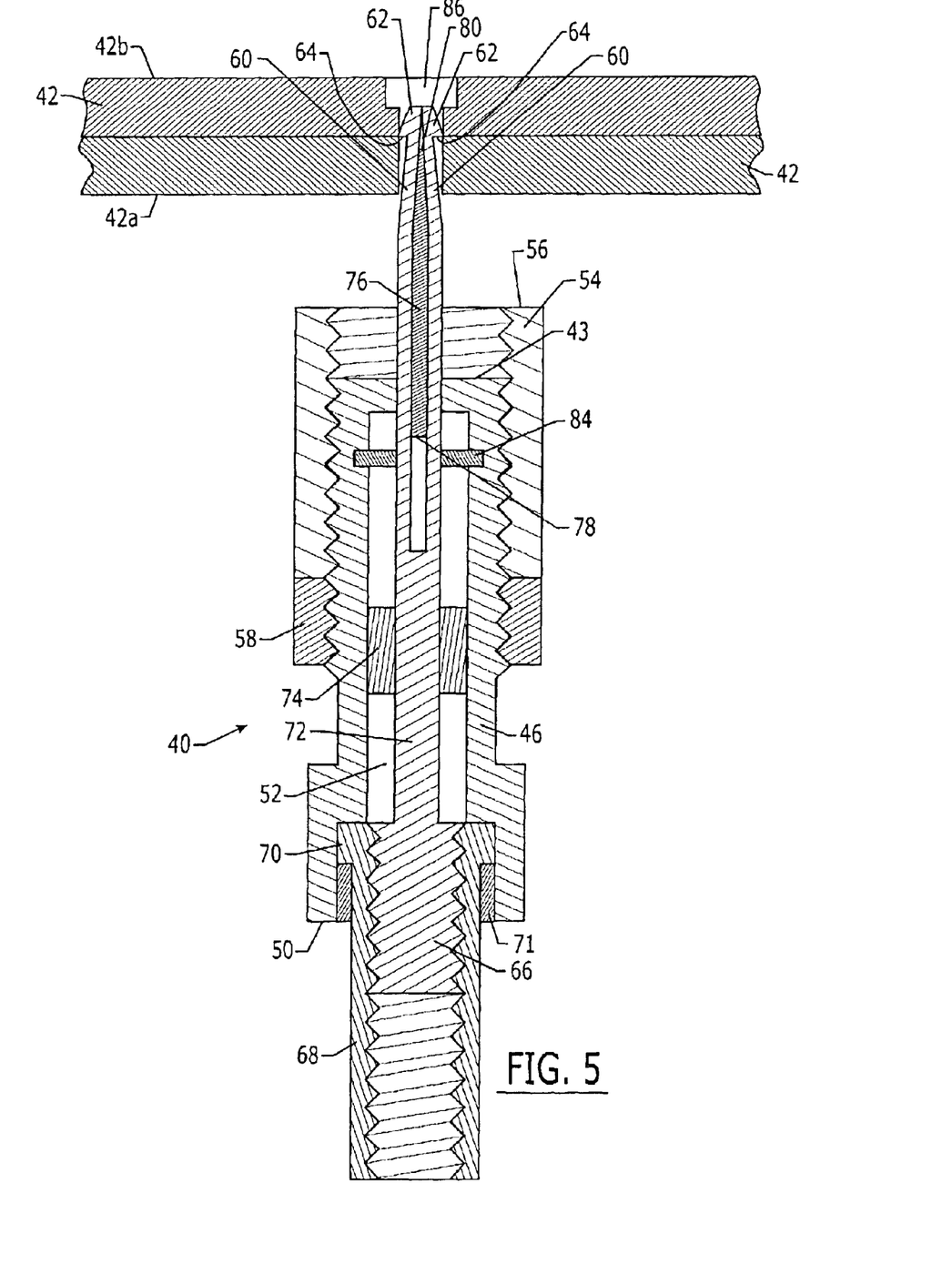
FIG. 5 is a cross-sectional view of the wedge-lock fastener of FIG. 2 depicting the initial installation of the wedge-lock fastener within the aligned holes defined by a pair of workpieces.
Figure 6:
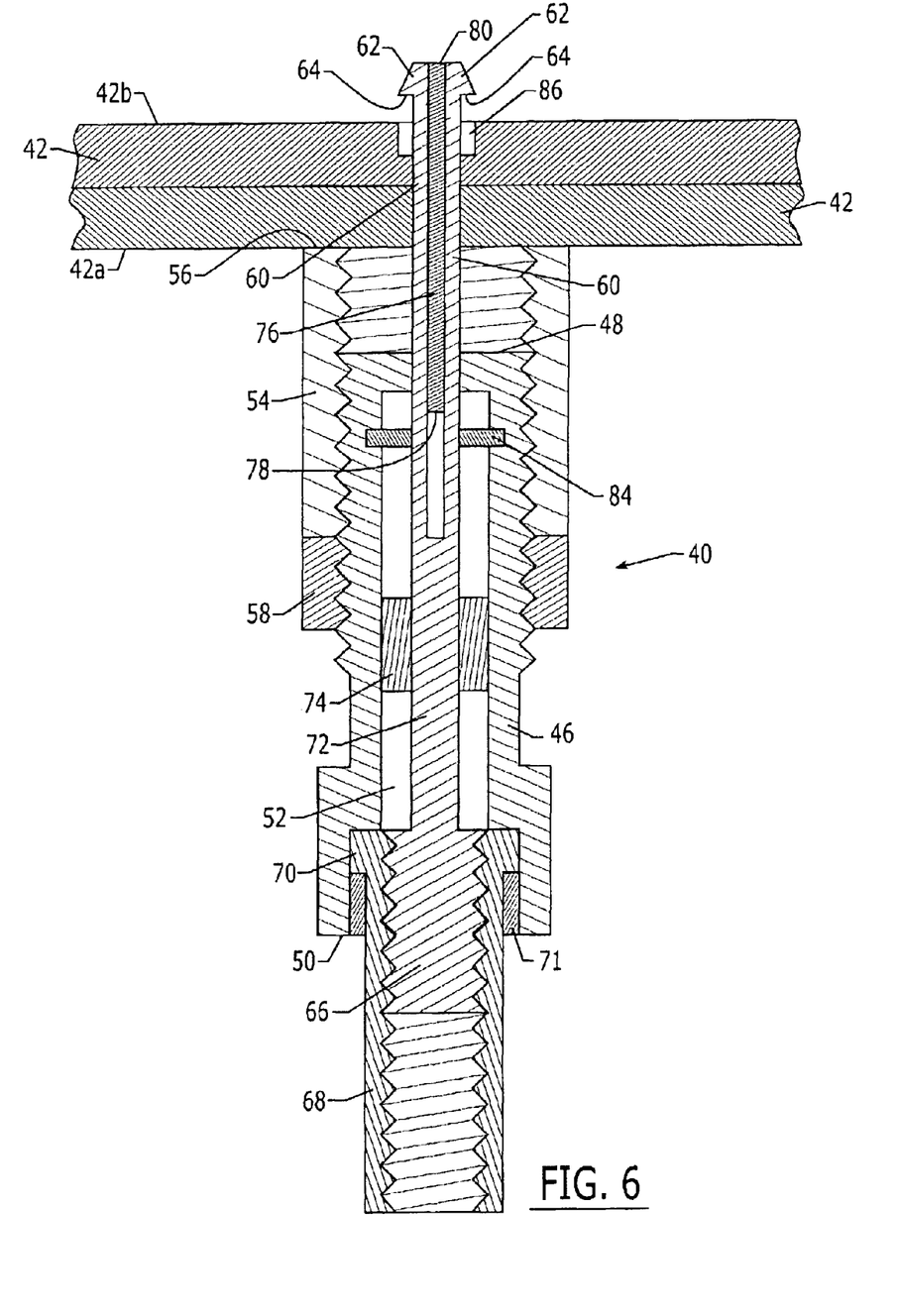
FIG. 6 is a cross-sectional view of the wedge-lock fastener of FIG. 2 following insertion of the respective forward ends of the tongue and the tongs through the aligned holes defined by a pair of workpieces and prior to retraction of the tongs.

In order to install the wedge-lock fastener 40, a workpiece 42 and, more typically, two or more workpieces that define respective holes are positioned such that the respective holes are aligned. The respective forward ends of the tongue 76 and the tongs 60 of the wedge-lock fastener are inserted through the aligned holes defined by the workpieces. During the insertion through the respective holes as shown in FIG. 5, the tong assembly is positioned relative to the shank 46 such that the forward ends 62 of the tongs extend beyond the forward end 80 of the tongue. As such, the forward ends of the tongs may be compressed laterally toward one another so as to fit through the hole. As in the process of installing conventional wedge-lock fasteners, the tongs are then retracted relative to the tongue, such as by rotation of the tong nut 68 relative to the shank such that the tongs move from the position depicted in FIG. 6 to that shown in FIGS. 2 and 3. As such, the forward ends of the tongs are drawn rearwardly until the tongue extends therebetween. The tongue forces the respective forward ends of the tongs laterally outward such that the barbed forward ends of the tongs are now larger than the aligned holes through which the tongs had been inserted. Thus, the forward ends of the tongs and, in particular, the respective shoulders 64 defined by the barbed forward ends of the tongs may operatively engage the workpieces.

Figure 4:
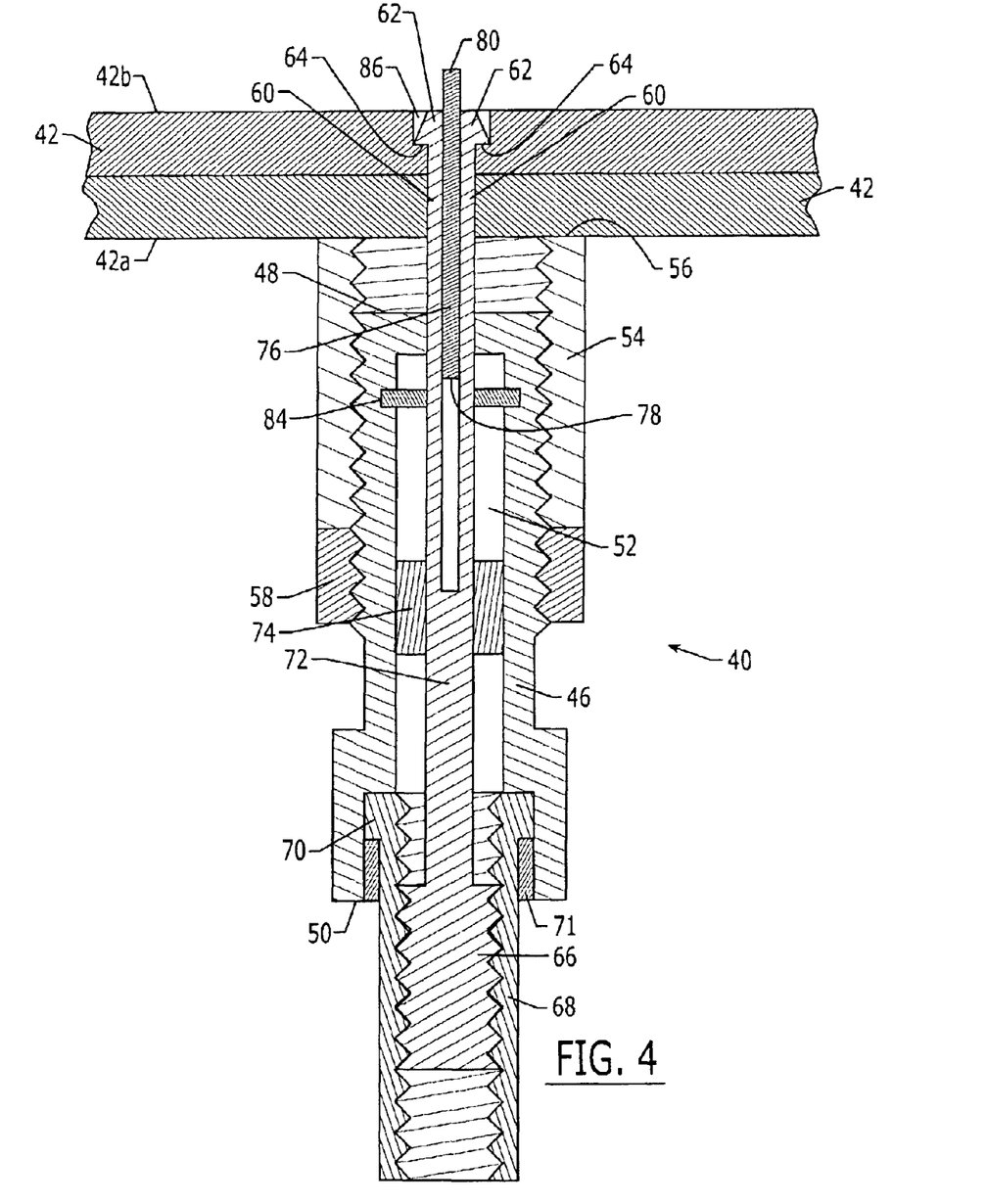
FIG. 4 is a cross-sectional view of the wedge-lock fastener of FIG. 2 in which the adjustable spacer member has been retracted relative to the shank such that the forward end of the tongue protrudes beyond the workpieces.

According to the present invention, the distance, if any, that the tongue 76 extends beyond the workpieces 42 that are clamped together by the wedge-lock fastener 40 is advantageously controlled. In conjunction with the embodiment of the wedge-lock fastener described above, the position of the tongue relative to the workpieces may be altered by controllably moving the adjustable spacer member 54 relative to the shank 46, thereby adjusting the distance by which the adjustable spacer member extends beyond the shank. In this regard, the adjustable spacer member generally extends beyond the forward end 48 of the shank and contacts, either directly or indirectly, a first surface 42*a* of the workpieces to be clamped by the wedge-lock fastener. Since the tongue extends a fixed distance between the forward end of the shank, retraction the adjustable spacer member relative to the shank, such as by threadably retracting the adjustable spacer member, causes the tongue to extend further relative to the workpieces since a smaller portion of the tongue is required to extend from the forward end of the shank through the retracted adjustable spacer member to the first surface of the workpiece. See FIG. 4. Alternatively, advancement of the adjustable spacer member relative to the shank will correspondingly cause the tongue to effectively retract relative to the workpieces since a larger portion of the tongue will be required to extend from the forward end of the shank through the extended adjustable spacer member to the first surface of the workpiece. Although the adjustable spacer member may be controllably positioned relative to the forward end of the shank in various manners, the adjustable spacer member of one advantageous embodiment is controllably positioned relative to the forward end of the shank such that the forward end of the tongue is proximate to and, advantageously, coincident with the forward ends of the tongs once the tongs have been retracted and the workpieces have been securely clamped by the wedge-lock fastener 40.

In the illustrated embodiment, one of the workpieces 42, namely, the workpiece that is positioned opposite the wedge-lock fastener 40, defines a counterbore 86 into which the holes open. The counterbore is preferably sized in width and depth to fully receive the barbed forward ends 62 of the tongs 60. Once the workpieces have been clamped between the barbed forward ends of the tongs and the forward end 56 of the adjustable spacer member 54, the barbed forward ends of the tongs do not extend beyond the second surface 42b of the workpieces. By appropriately positioning the adjustable spacer member relative to the forward end 48 of the shank 46, the forward end 80 of the tongue 76 may also be positioned proximate to the barbed forward ends of the tongs once the tongs have been retracted and the workpieces have been clamped together by the wedge-lock fastener such that the tongue also is completely disposed within the counterbore and does not extend beyond the second surface of the workpieces. As such, the forward ends of the tongue and the tongs will not scratch any additional workpiece 88 that is laid upon the second surface of the workpieces that are clamped together by the wedge-lock fastener.

In one embodiment, the wedge-lock fastener 40 is initially fabricated such that a forward end 80 of the tongue 76 extends beyond the forward ends of the tongs 60 once the tongs have been retracted so as to engage the workpieces 42, even in instances in which the adjustable spacer member 54 is fully extended relative to the shank 46. As described below, the tongue may then be properly sized to accommodate workpieces having a desired range of thicknesses. It should be kept in mind, however, that the tongue may be initially fabricated to have the proper size and therefore need not be sized, as described below, prior to the installation of the wedge-lock fastener, but the adjustable spacer member would still permit the wedge-lock fastener to accommodate workpieces having some variation in thickness.

Figure 7:
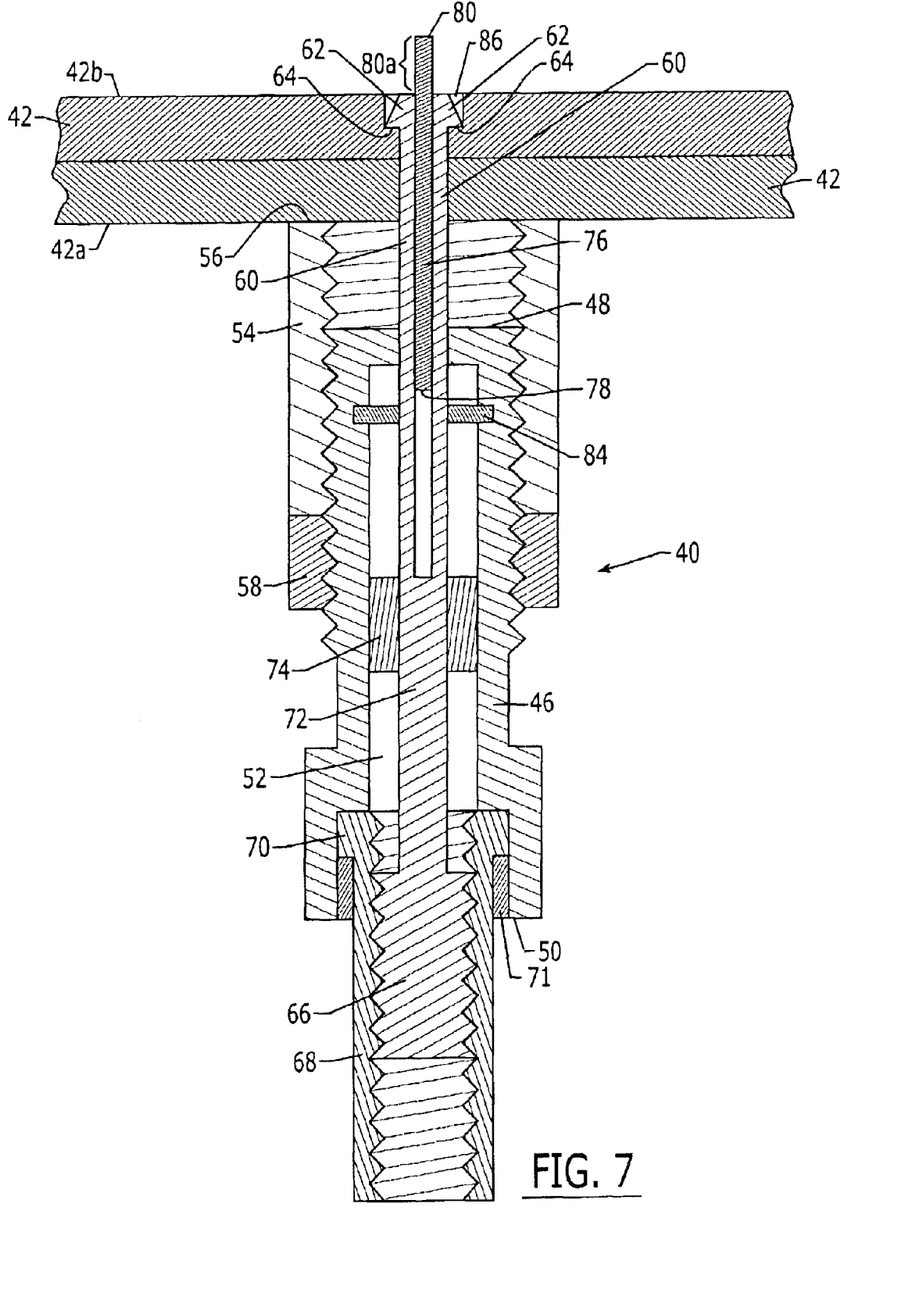
FIG. 7 is a cross-sectional view of a wedge-lock fastener according to one embodiment of the present invention depicting the distal portion of the tongue that protrudes beyond the surface of a workpiece and that is therefore to be removed.

In the embodiment in which the wedge-lock fastener 40 is initially fabricated with a tongue 76 that is longer than necessary, the wedge-lock fastener may be installed as described above with the barbed forward ends of the tongs 60 being recessed within a counterbore 86 defined by the second surface 42a of the workpieces 42. As shown in FIG. 7, however, the tongue of this embodiment extends beyond the second surface of the workpieces and therefore would pose a scratch hazard for additional workpieces 88 to be placed thereupon. In this embodiment, the forward portion 80a of the tongue that extends beyond the second surface of the workpieces may be removed. While the forward portion of the tongue may be removed in various manners, that portion of the tongue that extends beyond the second surface of the workpieces may be cut off or ground off, as desired. As such, the forwardmost end of the tongue that remains following the removal of that portion of the tongue that extended beyond the second surface of the workpiece is proximate to the barbed forward ends of the tongs and disposed with the counterbore so as to no longer extend beyond the second surface of the workpieces.

In this regard, the technique for removing that portion 80a of the tongue 76 that extends beyond the counterbore 86 defined by one of the workpieces clamped together by the wedge-lock fastener 40 may be employed in conjunction with embodiments of the wedge-lock fastener that do not include an adjustable spacer member 54. However, this technique is also advantageous for wedge-lock fasteners of the present invention that include an adjustable spacer member.

In this regard, the wedge-lock fastener 40 is generally utilized to temporarily clamp together two or more workpieces 42. Once the workpieces that have been temporarily clamped by the wedge-lock fastener have been more permanently attached, the wedge-lock fastener is then removed by reversing the steps described above, i.e., by extending the tongs 60 relative to the tongue 76, compressing the barbed forward ends 62 of the tongs together and then withdrawing the forward ends of the tongs and the tongue through the aligned holes defined by the workpieces. The wedge-lock fastener may then be reused so as to temporarily fasten another pair of workpieces. By including an adjustable spacer member 54, the wedge-lock fastener of the present invention permits the workpieces that are to be clamped together to vary somewhat in thickness, that is, to vary in thickness by any amount up to an amount equal to the maximum distance by which the forward end 56 of the adjustable spacer member can extend beyond the forward end 48 of the shank. Thus, once the tongue has been appropriately sized by removing that portion of the tongue that extends beyond the counterbore 86 defined by one of the workpieces clamped together by the wedge-lock fastener, the wedge-lock fastener may be reused to clamp together other workpieces that vary somewhat in thickness with the differences in thickness being compensated for by the controlled adjustment of the adjustable spacer member relative to the shank such that the respective forward ends of the tongs and tongue remain within the counterbore defined by the workpieces now clamped together by the wedge-lock fastener.

By being seated within the counterbore 86, the respective forward ends of the tongs 60 and the tongue 76 do not scratch another workpiece 88 as the other workpiece is placed upon the workpieces 42 that are clamped together by the wedge-lock fastener 40. The complete assembly may then be fastened together, such as by forming holes through the workpieces clamped together by the wedge-lock fastener and the additional workpiece that has been laid thereupon and thereafter installing permanent fasteners, such as rivets, bolts or the like, through the holes. Thereafter, the wedge-lock fasteners may be removed and reused. In order to facilitate the removal of the wedge-lock fasteners, the additional workpiece that is laid upon the workpieces clamped together by the wedge-lock fastener may also define a hole in alignment with respective holes defined by workpieces clamped together by the wedge-lock fastener. As shown in FIG. 2, the hole defined by the additional workpiece may be sized the same as the counterbore to receive the respective forward ends of the tongs as the tongs are extended during the process of removing the wedge-lock fastener.

While the wedge-lock fastener 40 may be utilized in a wide variety of applications to clamp together many different types of workpieces 42, the wedge-lock fastener of the present invention can clamp together a plurality of stringers and frames to form a stringer/frame assembly during the process of assembling a fuselage, such as an aircraft fuselage, or the like. In this regard, the stringers may be positioned relative to the frames, such as by being disposed within respective mouse-holes defined by the frames, such that holes defined by the stringers are aligned with corresponding holes defined by the frames. Wedge-lock fasteners of the present invention may be extended through the aligned holes and the stringer/frame assembly clamped together. Thereafter, the skin of the fuselage may be placed upon the stringer/frame assembly without concern that the skin will be scratched or otherwise damaged by the forward ends of the tongs 60 and tongue 76 extending beyond the stringer/frame assembly. In this regard, the surface of the stringers that faces the skin may define counterbores into which the respective holes open and within which the tongs and the tongue of the wedge-lock fasteners are disposed. As such, the respective forward ends of the tongs and tongue advantageously do not extend beyond the surface of the stringers. Holes may then be formed as appropriate through the skin, the stringers and/or the frames and permanent fasteners, such as rivets, bolts or the like, inserted. Thereafter, the wedge-lock fasteners may be removed and reused. As a result, the process for assembling a fuselage or other structure requiring the temporary assembly of a subset of the components is simplified and the risk of scratching or otherwise damaging the skin is substantially reduced, if not eliminated, by use of the wedge-lock fasteners of the present invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A wedge-lock fastener comprising:
   a shank defining a lengthwise extending passage opening through a forward end thereof;
   an adjustable spacer member adapted for controlled lengthwise movement relative to said shank such that a forward end of said adjustable spacer member extends beyond the forward end of said shank by a selectable distance;
   at least two tongs adapted to be threadably advanced and retracted for lengthwise movement relative to said shank and said adjustable spacer member, each tong having a respective forward end extending beyond the forward ends of said shank and said adjustable spacer member, the forward end of each tong capable of lateral movement toward and away from one another; and
   a tongue disposed between said at least two tongs and engaged by said shank, said tongue extending from a rear end within the passage defined by said shank to a forward end that extends beyond the forward ends of said shank and said adjustable spacer member.

2. A wedge-lock fastener according to claim 1 further comprising a locking member for securing said adjustable spacer member in position relative to said shank.

3. A wedge-lack fastener according to claim 1 adapted to clamp a plurality of workpieces, wherein said adjustable spacer member is capable of extending beyond the forward end of said shank by a range of selectable distances that is at least as large as anticipated variations in thickness of the plurality of workpieces.

4. A wedge-lock fastener comprising:
   a shank defining a lengthwise extending passage opening through a forward end thereof;
   an adjustable spacer member adapted for controlled lengthwise movement relative to said shank such that a forward end of said adjustable spacer member extends beyond the forward end of said shank by a selectable distance, wherein said adjustable spacer member threadably engages the forward end of said shank;
   at least two tongs adapted to be threadably advanced and retracted for lengthwise movement relative to said shank and said adjustable spacer member, each tong having a respective forward end extending beyond the forward ends of said shank and said adjustable spacer member; and
   a tongue disposed between said at least two tongs and engaged by said shank, said tongue extending from a rear end within the passage defined by said shank to a forward end that extends beyond the forward ends of said shank and said adjustable spacer member.

5. A wedge-lock fastener according to claim 4 wherein the forward end of said shank is externally threaded, and wherein said adjustable spacer member is internally threaded so as to be mounted upon the forward end of said shank in a surrounding relationship thereto.

6. A wedge-lock fastener comprising:
   a shank defining a lengthwise extending passage opening through a forward end thereof;
   an adjustable spacer member adapted for controlled lengthwise movement relative to said shank such that a forward end of said adjustable spacer member extends beyond the forward end of said shank by a selectable distance;
   at least two tongs adapted to be threadably advanced and retracted for lengthwise movement relative to said shank and said adjustable spacer member, each tong having a respective forward end extending beyond the forward ends of said shank and said adjustable spacer member;
   a tongue disposed between said at least two tongs and engaged by said shank, said tongue extending from a rear end within the passage defined by said shank to a forward end that extends beyond the forward ends of said shank and said adjustable spacer member; and
   a locking member for securing said adjustable spacer member in position relative to said shank, wherein said locking member comprises a lock nut disposed upon and threadably engaging said shank rearward of said adjustable spacer member.

7. A method comprising:
   inserting a tongue and at least two tongs of the wedge-lock fastener through a hole defined by a workpiece;
   altering a position of the tongue relative to the workpiece by controllably moving an adjustable spacer member relative to a shank of the wedge-lock fastener with which the tongue is engaged, thereby adjusting a distance by which the adjustable spacer member extends beyond the shank, wherein controllably moving the adjustable spacer member relative to the shank of the wedge-lock fastener comprises threadably advancing the adjustable spacer member relative to the shank; and
   threadably retracting the at least two tongs relative to the tongue such that respective forward ends of the tongs are urged outwardly to operatively engage the workpiece.

8. A method for installing a wedge-lock fastener comprising:
   inserting a tongue and at least two tongs of the wedge-lock fastener through a hole defined by a workpiece while respective forward ends of the at least two tongs are extended beyond the tongue and are compressed laterally toward one another;
   altering a position of the tongue relative to the workpiece by controllably moving an adjustable spacer member relative to a shank of the wedge-lock fastener with which the tongue is engaged, thereby adjusting a distance by which the adjustable spacer member extends beyond the shank; and
   threadably retracting the at least two tongs relative to the tongue such that respective forward ends of the tongs are urged outwardly to operatively engage the workpiece.

9. A method according to claim 8 wherein the workpiece also defines a counterbore into which the hole opens, and wherein altering the position of the tongue comprises positioning a forward end of the tongue completely within the counterbore.

10. A method according to claim 9 wherein retracting the at least two tongs comprises retracting the at least two tongs such that respective forward ends of the at least two tongs are also disposed completely within the counterbore.

11. A method according to claim 8 further comprising securing the adjustable spacer member in position relative to the shank once the position of the tongue has been altered and prior to retracting the at least two tongs.

12. A method according to claim 8 wherein the workpiece also defines a counterbore into which the hole opens, and wherein the method further comprises removing at least a forward end of the tongue that extends beyond the counterbore defined by the workpiece.

13. A method for installing a wedge-lock fastener comprising:
   providing a workpiece defining a hole that opens into a counterbore proximate a first surface of the workpiece;
   inserting a tongue and at least two tongs of the wedge-lock fastener through the hole defined by the workpiece;
   retracting the at least two tongs relative to the tongue such that respective forward ends of the tongs are urged outwardly to operatively engage the workpiece; and
   removing at least a forward end of the tongue that extends beyond the first surface of the workpiece.

14. A method according to claim 13 wherein removing at least the forward end of the tongue comprises cutting off that portion of the tongue that extends beyond the first surface of the workpiece.

15. A method according to claim 13 wherein removing at least the forward end of the tongue comprises grinding off that portion of the tongue that extends beyond the first surface of the workpiece.

16. A method according to claim 13 wherein retracting the at least two tongs comprises retracting the at least two tongs such that respective forward ends of the at least two tongs are completely disposed within the counterbore.

17. A method for assembling a plurality of workpieces comprising:
   positioning at least first and second workpieces to align respective holes defined by the workpieces, wherein a first surface of the second workpiece also defines a counterbore into which the respective hole opens;
   installing a wedge-lock fastener through the respective holes defined by the workpieces to thereby clamp the workpieces together, wherein installing the wedge-lock fastener comprises positioning respective forward ends of a tongue and at least two tongs of the wedge-lock fastener completely within the counterbore; and
   placing a third workpiece on the first surface of the second workpiece while the wedge-lock fastener is installed.

18. A method according to claim 17 wherein installing the wedge-lock fastener comprises:
   inserting the tongue and the at least two tongs through the respective holes defined by the first and second workpieces;
   altering a position of the tongue relative to the first and second workpieces such that the forward end of the tongue is completely within the counterbore, wherein altering the position of the tongue comprises controllably moving an adjustable spacer member relative to a shank of the wedge-lock fastener, thereby adjusting a distance by which the adjustable spacer member extends beyond the shank; and
   retracting the at least two tongs relative to the tongue such that respective forward ends of the tongs are urged outwardly to operatively engage the second workpiece while also being positioned completely within the counterbore.

19. A method according to claim 17 wherein installing the wedge-lock fastener comprises:
   inserting the tongue and the at least two tongs of the wedge-lock fastener through the respective holes defined by the first and second workpieces;
   retracting the at least two tongs relative to the tongue such that respective forward ends of the tongs are urged outwardly to operatively engage the second workpiece while being positioned completely within the counterbore; and
   removing at least the forward end of the tongue that extends beyond the first surface of the second workpiece.

20. A method according to claim 17 wherein positioning the first and second workpieces comprises positioning a plurality of stringers relative to a plurality of frames such that respective holes defined by the stringers and frames are aligned.

21. A method according to claim 20 wherein placing the third workpiece on the first surface of the second workpiece comprises placing a skin upon the plurality of stringers while the wedge-lock fastener is installed.

* * * * *